US008544391B2

(12) United States Patent
Knox et al.

(10) Patent No.: US 8,544,391 B2
(45) Date of Patent: Oct. 1, 2013

(54) VARIABLE HEIGHT SUPPORT

(75) Inventors: Howard T. Knox, Independence, KY (US); Edward K. Saunders, Erlanger, KY (US)

(73) Assignee: Ancra International LLC, Azusa, CA (US)

( * ) Notice: Subject to any disclaimer, the term of this patent is extended or adjusted under 35 U.S.C. 154(b) by 0 days.

(21) Appl. No.: 13/316,743

(22) Filed: Dec. 12, 2011

(65) Prior Publication Data

US 2013/0145972 A1 Jun. 13, 2013

(51) Int. Cl.
*A47B 9/00* (2006.01)

(52) U.S. Cl.
USPC .............................. 108/145; 108/120; 108/12

(58) Field of Classification Search
USPC .............. 108/145, 146, 147, 147.22, 12, 118, 108/120, 116, 117, 119; 248/188.1, 188.2, 248/188.6, 354.1
See application file for complete search history.

(56) References Cited

U.S. PATENT DOCUMENTS

| | | | | |
|---|---|---|---|---|
| 2,641,247 A * | 6/1953 | Genebach | ................ | 126/337 A |
| 3,410,328 A * | 11/1968 | Sasai | .............................. | 220/9.2 |
| 4,032,103 A * | 6/1977 | Ehrichs | .......................... | 248/421 |
| 4,249,749 A * | 2/1981 | Collier | ............................. | 280/35 |
| 4,685,731 A * | 8/1987 | Migut | ..................... | 297/344.17 |
| 5,324,064 A * | 6/1994 | Sumser et al. | ................ | 280/649 |
| 5,447,319 A * | 9/1995 | Huang | ..................... | 280/87.051 |
| 5,588,377 A * | 12/1996 | Fahmian | ....................... | 108/145 |
| 7,204,343 B1 * | 4/2007 | Seaman | ......................... | 182/29 |
| 7,849,789 B1 * | 12/2010 | Whelan | ........................... | 99/537 |
| 8,015,638 B2 * | 9/2011 | Shimada et al. | ................... | 5/611 |
| 8,016,305 B2 * | 9/2011 | Cheng | ..................... | 280/87.051 |
| 2004/0040480 A1 * | 3/2004 | Hwang | ........................ | 108/145 |
| 2007/0034125 A1 * | 2/2007 | Lo | ................................. | 108/145 |

* cited by examiner

*Primary Examiner* — Janet M Wilkens
*Assistant Examiner* — Daniel Rohrhoff
(74) *Attorney, Agent, or Firm* — Brinks Hofer Gilson & Lione

(57) ABSTRACT

A variable height support with a platform and a base supporting the platform and reconfigurable to selectively change a height of a support surface on the platform relative to a subjacent surface. A control assembly is operable to selectively: a) maintain the support surface at a selected height; and b) release the platform to allow the base to be reconfigured to change the height of the support surface. The control assembly has a ratchet subassembly that, with the control assembly in a first state, allows the base to be reconfigured by exerting a continuous upward force upon the platform that causes the platform to elevate and be blocked within a range at a plurality of different vertical locations against downward movement. The control assembly further has an actuator that is repositionable to change the control assembly into a second state wherein the platform can be lowered over the range.

27 Claims, 10 Drawing Sheets

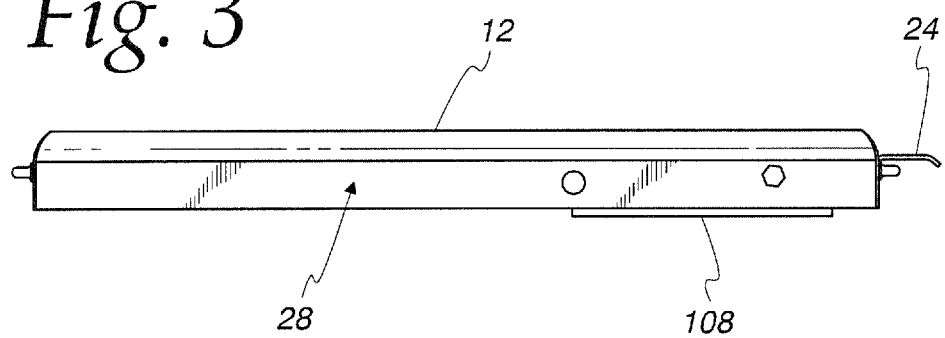
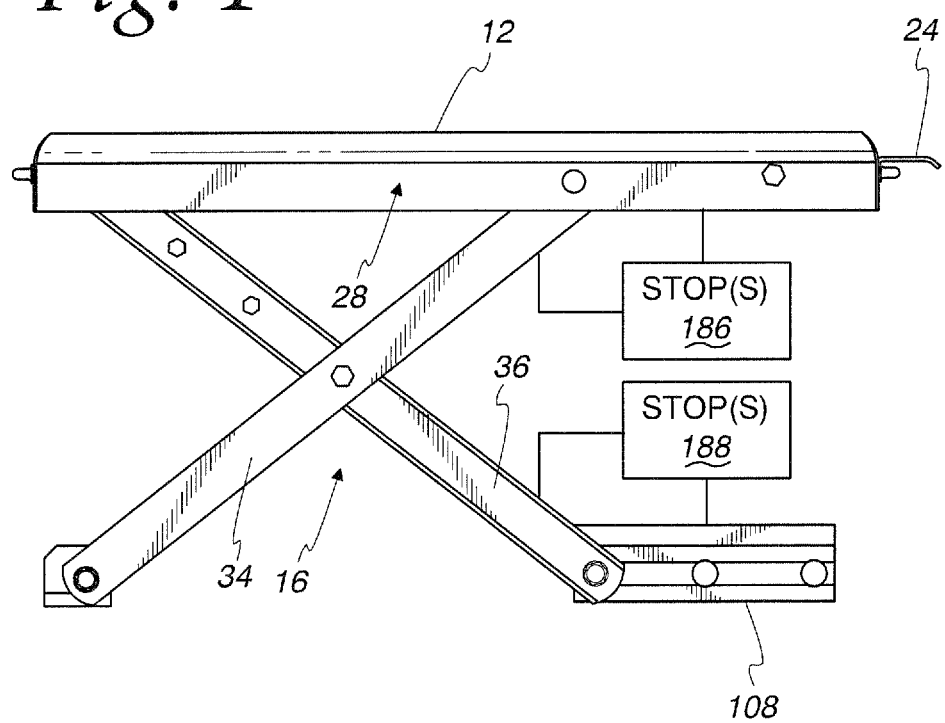

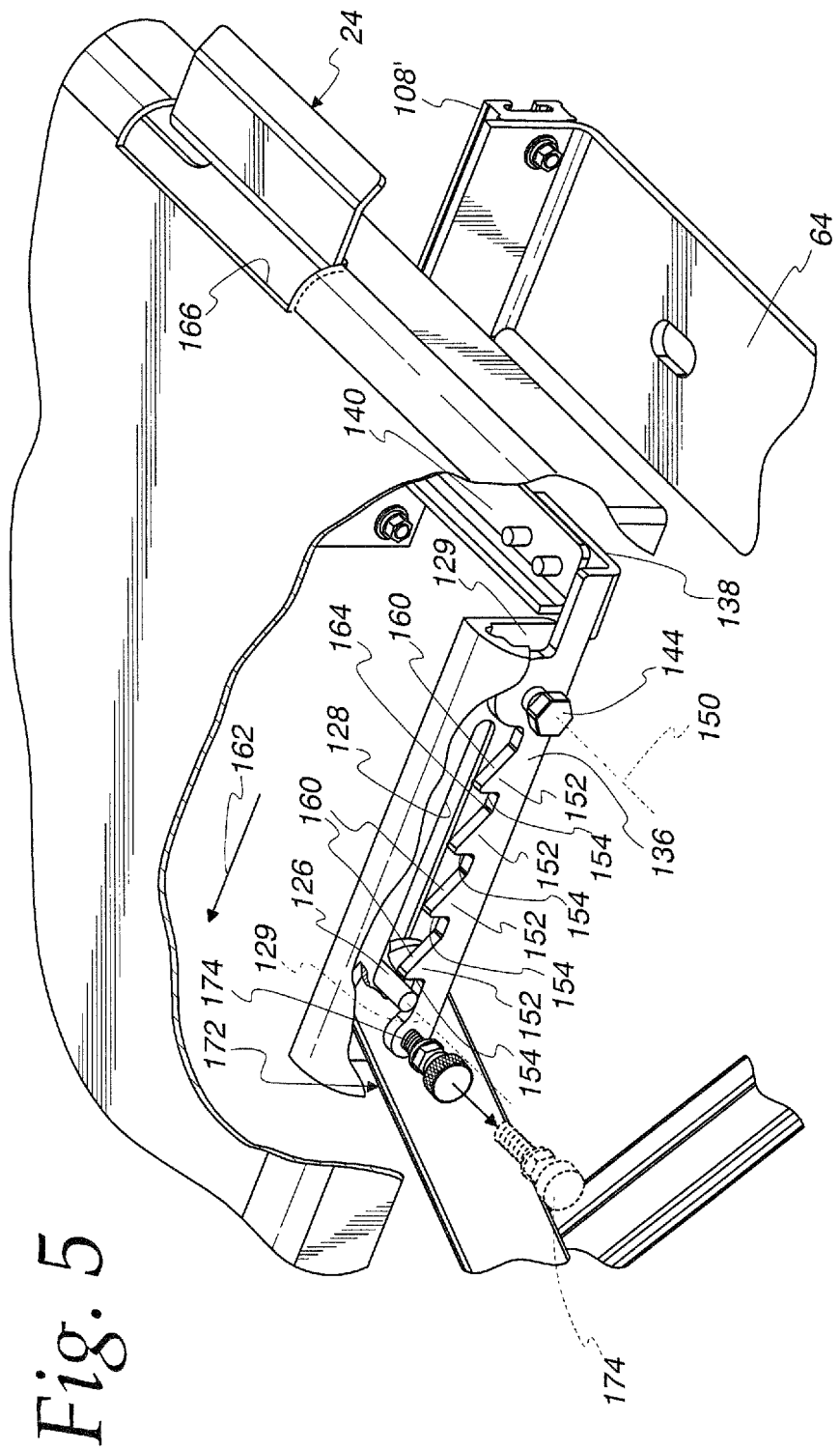

VARIABLE HEIGHT SUPPORT

BACKGROUND OF THE INVENTION

1. Field of the Invention

This invention relates to platforms upon which individuals can stand and, more particularly, to a platform with a weight supporting surface that can be adjusted in a vertical direction.

2. Background Art

Platforms are used in a number of different environments to support persons, as in a standing position. Commonly, these platforms are made so that a weight supporting surface thereon is adjustable in a vertical direction to accommodate persons of different height and/or to allow an individual to change his/her effective standing height, depending upon the activity engaged in.

Such platforms are commonly used in military applications, as in vehicles to support individuals operating weapons in a standing position. In this environment, there are very critical design criteria that guide the engineering of these platforms.

First and foremost, the platform must provide a stable support for an individual and must not fail. A weapons operator standing on such a platform is precariously situated and must balance him-/herself as the particular weaponry is handled. In the event that the platform is mounted on a moving vehicle, the normal movement of the vehicle by itself causes shifting of the vehicle occupants, which is aggravated in the event that the underlying terrain is uneven. Loading and weight shifting on these platforms may thus be severe and must be accommodated.

Further, it is important that a weapons operator be able to quickly change the vertical height of a supporting surface on the platform as a field condition may demand. The platform must have the same structural stability with the supporting surface in each of the selected heights.

Further, during the process of changing the height of the platform, the operator may have limited space within which to maneuver and reconfigure the platform and/or may have obstructed access to the platform in the field. Commonly, the platforms are surrounded by other equipment which blocks or limits access to the platform around its perimeter. The space limitations thus inhibit access to any adjusting actuators and also inherently limit range of movement of any such actuators.

Weapons operators may themselves also be confined in movement around the platform, which limits access. These operators commonly wear gloves and other protective clothing and may also be limited to using one hand during the adjustment process, with the other hand utilized to support themselves and/or hold other equipment, such as associated with the weaponry.

Ideally, the weapons operator would have the ability to effect height adjustment in a simple "on the fly" action. Further, it is desirable that the integrity of the platform not be compromised by reason of any adjustments made.

It is known to provide a platform with spaced, spring-loaded locking pins that maintain different heights of a supporting surface. While this design is functional, in many different applications it is not practical.

The separate pins are on opposite sides of the platform and require simultaneous operation. By necessity, this is a two-handed operation. In certain military applications, space requirements are limited to the point that this type of structure is not practical. Currently, platforms exist having two ball lock pins that are required to be pulled out of engagement simultaneously while holding a platform at a desired height. Holes must be aligned to allow the ball lock pins to be re-engaged. Visual access may be limited in certain applications to the point that platform adjustment is difficult to accomplish. Even if this design is feasible, it does not lend itself to quick adjustment and also requires a good degree of dexterity to align parts for insertion of pins at different selected heights.

The industry continues to seek out designs that would meet all of the above design criteria.

SUMMARY OF THE INVENTION

In one form, the invention is directed to a variable height support with a platform defining an upwardly facing support surface and a base for supporting the platform in an operative position upon a subjacent surface. The base is reconfigurable to selectively change the height of the support surface relative to the subjacent surface. A control assembly is operable to selectively: a) maintain the support surface at a selected height; and b) release the platform to allow the base to be reconfigured to change the height of the support surface relative to the subjacent surface. The control assembly has a ratchet subassembly that, with the control assembly in a first state, interacts between the platform and base to allow the base to be reconfigured by exerting a continuous upward force upon the platform that causes the platform to: a) elevate relative to the subjacent surface over a range; and b) be blocked within the range at a plurality of different vertical locations against downward movement. The control assembly further has an actuator that is repositionable between a normal position and an actuated position to thereby change the control assembly from the first state into a second state wherein the platform can be lowered over the full range.

In one form, the base has first and second links each with first and second ends. The links are joined to each other for relative pivoting movement. The first ends of the first and second links are connected to the platform and the second ends of the first and second links bear against the subjacent surface with the platform in the operative position.

In one form, the ratchet assembly has a first toothed bar that is mounted for pivoting movement relative to the platform about an axis.

In one form, the first toothed bar is biasably urged towards an engaged position and is movable from the engaged position into a disengaged position as an incident of the actuator being changed from the normal position into the actuated position.

In one form, the variable height support further has a lock assembly that is changeable between a locked state and an unlocked state. The lock assembly in the locked state fixes the first toothed bar in the engaged position. The lock assembly in the unlocked state allows the first toothed bar to be moved from the engaged position to the disengaged position by the actuator.

In one form, the lock assembly has a pin that is directed into the first toothed bar and platform with the lock assembly in the locked state.

In one form, the pin is translatable relative to the platform between an extended position and a retracted position. The pin is biased towards the extended position in which the pin resides with the lock assembly in the locked state. The pin is movable along a line from the extended position into the retracted position and turnable around the line to a retracted and stored position wherein the pin is maintained upon the platform in the retracted position without requiring any external force application upon the pin.

In one form, the lock assembly has a lock component that is pivotable around an axis between first and second positions.

The lock assembly is in the locked state with the lock component in its first position and in its unlocked state with the lock component in its second position.

In one form, the actuator has a graspable handle and the lock component in its first position is situated to be engaged together with the graspable handle by one hand of a user that can be used to urge parts of the graspable handle and lock component towards each other to thereby change the lock component into its second position.

In one form, the lock component is connected to the actuator for pivoting movement around an axis in changing between its first and second positions.

In one form, the lock component is biasably urged towards its first position.

In one form, the lock component has a blocking surface that engages the platform with the lock component in its first position to block movement of the actuator from its normal position into its actuated position.

In one form, the ratchet assembly has a second toothed bar that is spaced from the first toothed bar and mounted for pivoting movement relative to the platform.

In one form, the second toothed bar is biasably urged towards an engaged position and is movable from its engaged position into a disengaged position as an incident of the actuator being changed from the normal position into the actuated position.

In one form, the actuator is fixed to each of the first and second toothed bars so that the first and second toothed bars follow movement of the actuator as the actuator is moved between the normal and actuated positions.

In one form, the actuator pivots about an axis as the actuator changes between the normal and actuated positions.

In one form, the platform has a depending peripheral wall and the actuator projects through the depending peripheral wall.

In one form, the control assembly has a coil torsion spring that biasably urges the first toothed bar towards its engaged position.

In one form, the base further includes first and second brackets to be fixedly connected to a subjacent support. The first bracket is connected to the second end of the first link for pivoting movement about a fixed axis. The second bracket is connected to the second end of the second link so that the second end of the second link is guided by the second bracket in a horizontally extending path.

In one form, the horizontally extending path is substantially straight.

In one form, the platform has an opening through the upper surface bounded by an edge. The opening is configured to allow a user's hand to be directed into the opening to allow the edge to be grasped to thereby facilitate vertical movement of the platform.

In one form, the links each has an extruded form with a U-shaped cross-sectional configuration.

In one form, the platform is made as a molded part that defines the upwardly facing support surface.

In one form, the platform has a part that defines the upwardly facing surface and a depending peripheral wall. The axis about which the first toothed bar is mounted for pivoting movement extends through the peripheral wall.

In one form, the ratchet assembly has a first toothed bar that is mounted for pivoting movement relative to the platform about an axis. The variable height support further has a track with an elongate slot. The first end of one of the links is connected to the track for guided movement in a horizontal path. The axis about which the first toothed bar pivots extends through the track.

BRIEF DESCRIPTION OF THE DRAWINGS

FIG. 3 is a side elevation view of the variable height support with a platform thereon in a lowered/stored position;

FIG. 4 is a view as in FIG. 3 with the platform in a raised position, as in FIG. 1;

FIG. 5 is an enlarged, fragmentary, perspective view of a connection between a base and the platform on the variable height support and showing part of a ratchet subassembly for maintaining the platform at different selected heights;

DETAILED DESCRIPTION OF THE PREFERRED EMBODIMENT

Figure 1:
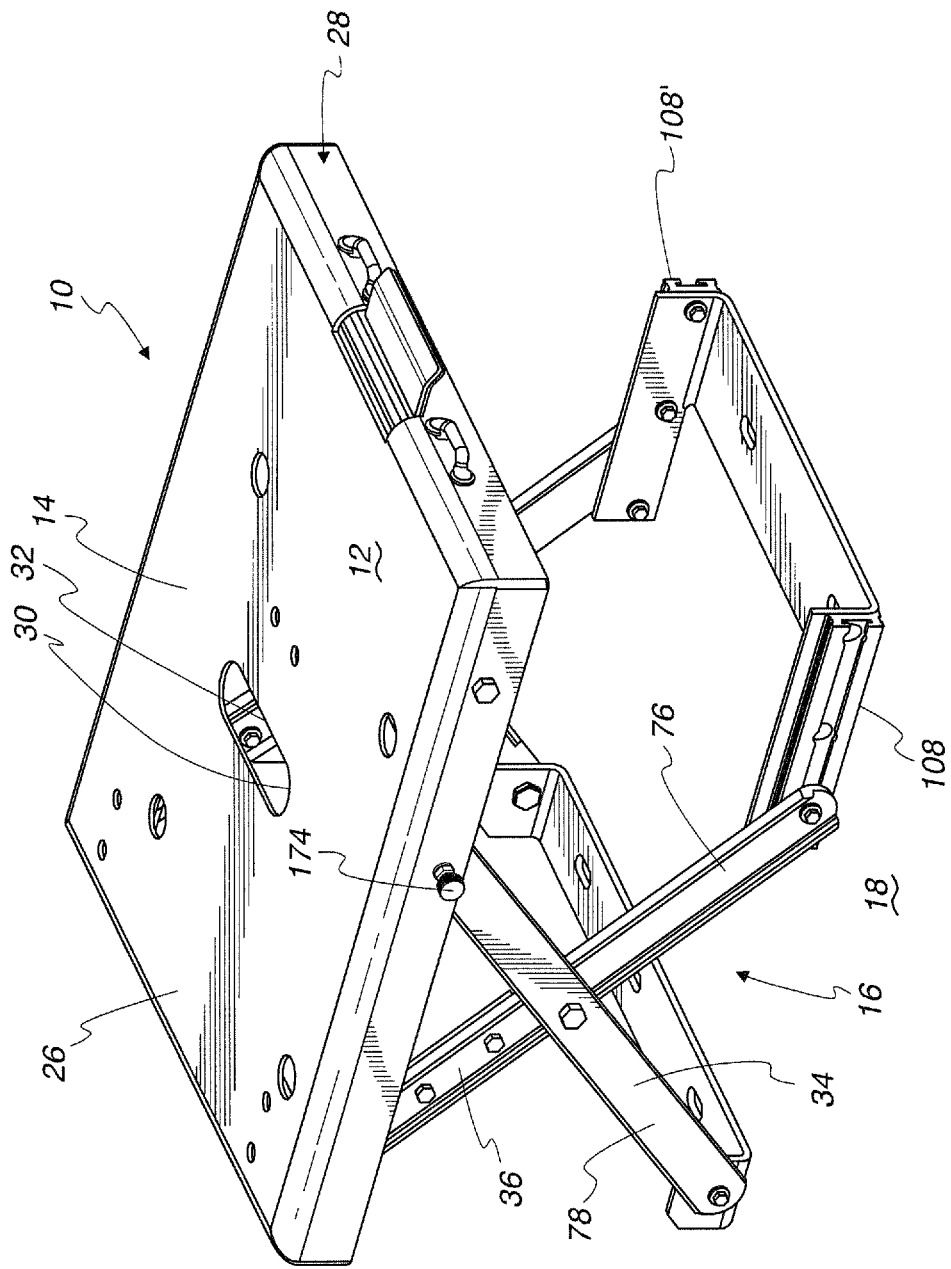
FIG. 1 is a perspective view of the inventive variable height support in an operative state.
Figure 2:
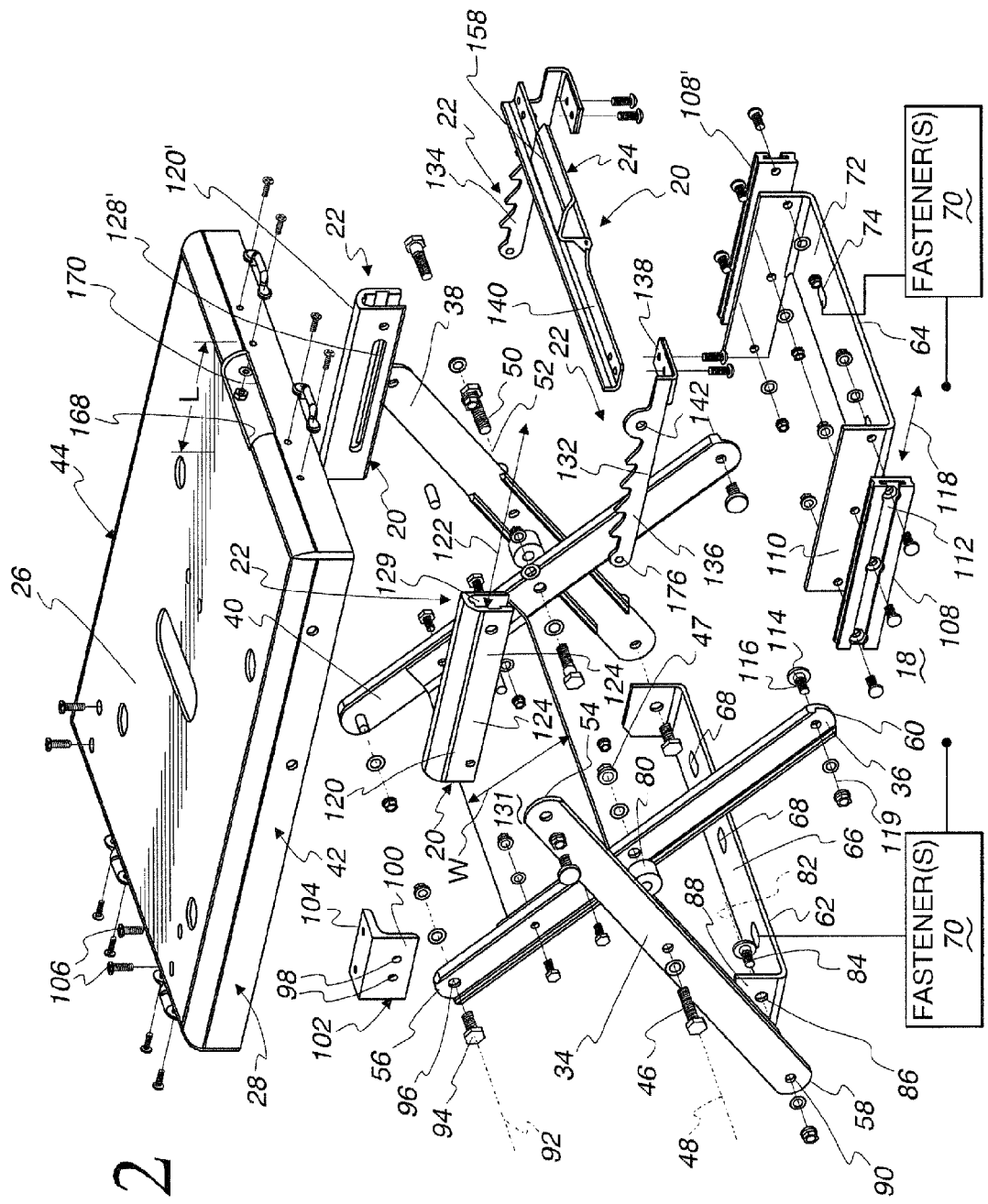
FIG. 2 is an exploded, perspective view of the variable height support.
Figure 6:
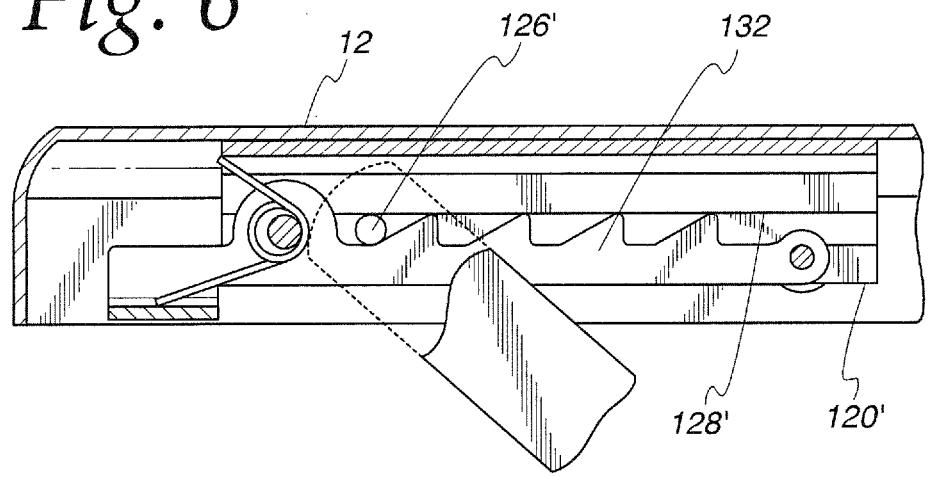
FIG. 6 is an enlarged, fragmentary, side elevation view of the variable height support with the platform broken away to show a part of the ratchet subassembly.
Figure 7:
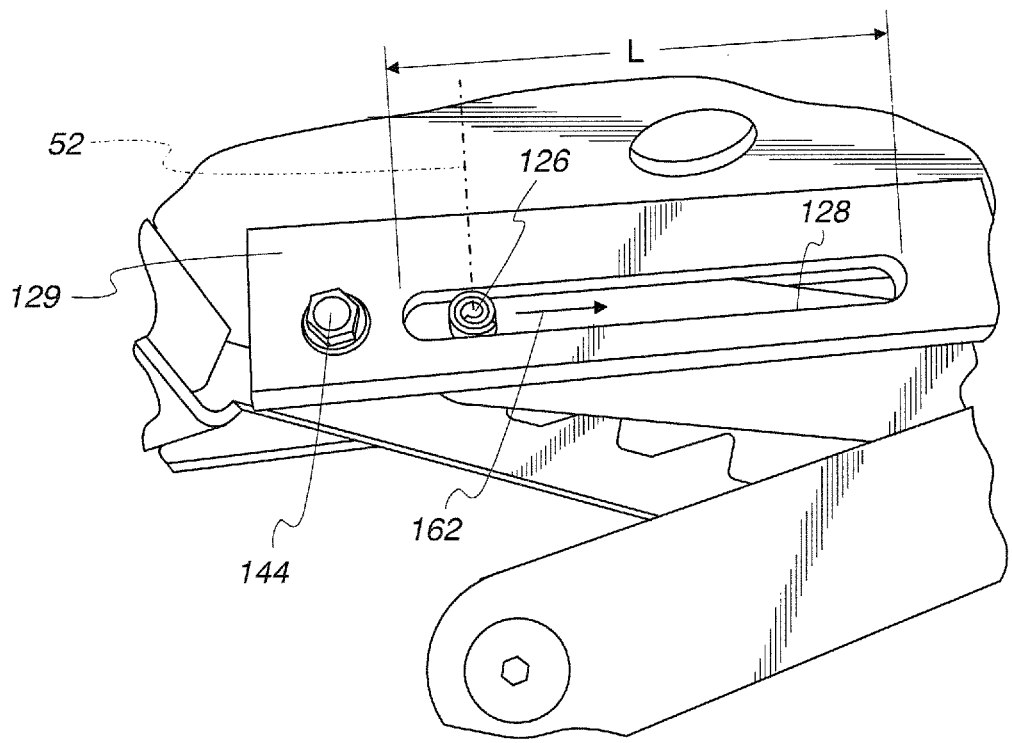
FIG. 7 is an enlarged, fragmentary view of a part of the ratchet subassembly from a different perspective than in FIG. 5.
Figure 8:
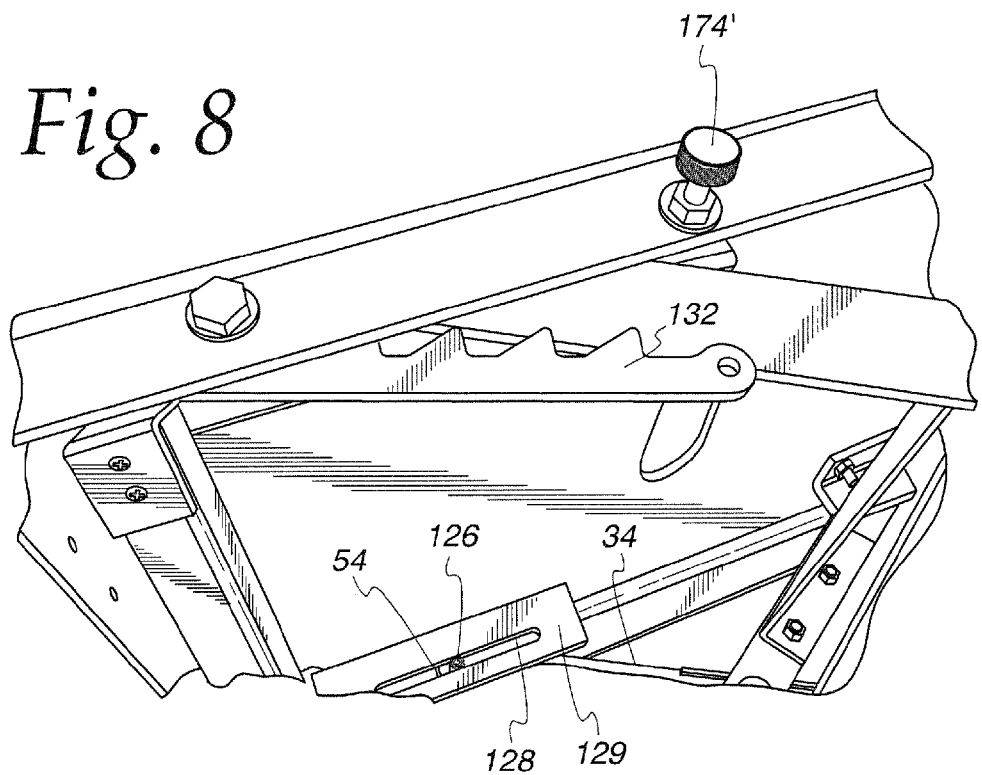
FIG. 8 is an enlarged, fragmentary view of a part of the ratchet subassembly from a further different perspective.
Figure 9:
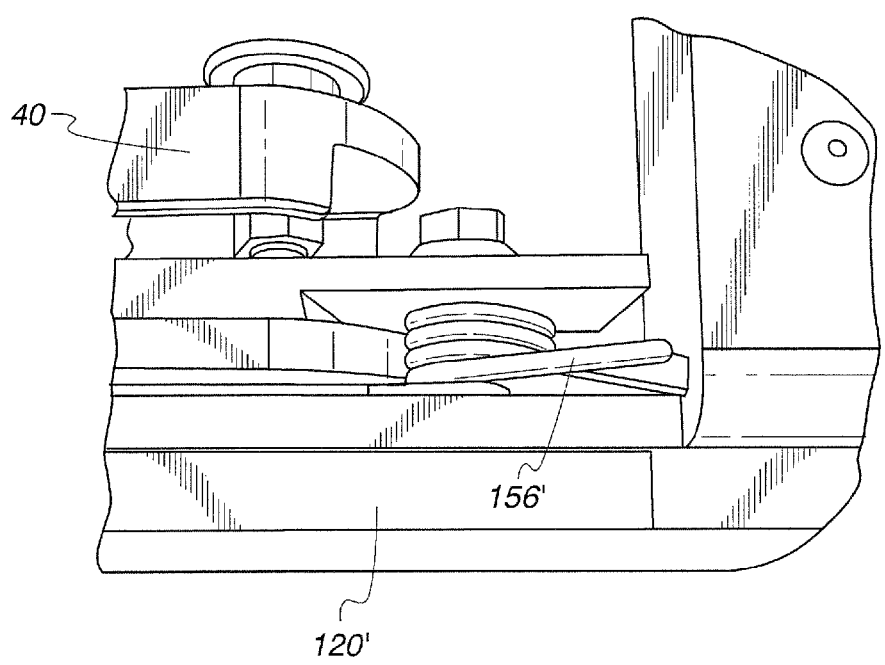
FIG. 9 is an enlarged, fragmentary view of a part of the ratchet subassembly from a still further different perspective.
Figure 10:
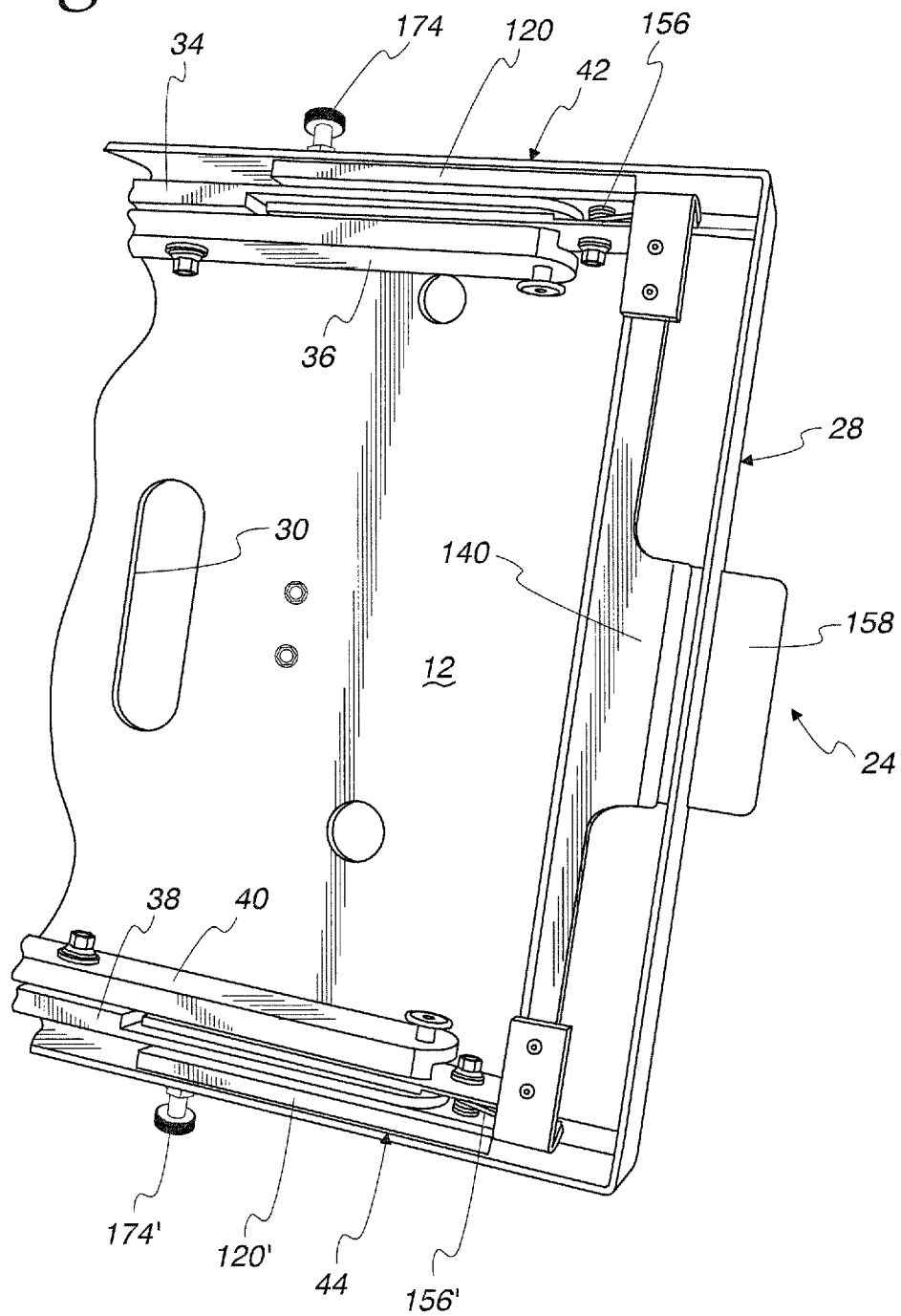
FIG. 10 is a bottom, fragmentary, perspective view of the variable height support and showing the ratchet subassembly and an actuator therefor with the variable height support in the FIG. 3 state.

In FIGS. 1-13, one form of variable height support, according to the present invention, is shown at 10. The support 10 has a platform 12 defining an upwardly facing support surface 14 upon which one or more individuals can stand or sit.

A base 16 supports the platform 12 in an operative position upon a subjacent surface 18 and is reconfigurable, as described hereinbelow, to selectively change the height of the platform 12, and thus the support surface 14 thereon, relative to the subjacent surface 18.

A control assembly at 20 is operable to selectively: a) maintain the support surface 14 at a selected height; and b) release the platform 12 to allow the base 16 to be reconfigured to change the height of the support surface 14 relative to the subjacent surface 18 over its operable range.

The control assembly 20 includes a ratchet subassembly at 22 that, with the control assembly 20 in a first state, interacts between the platform 12 and base 16 to allow the base 16 to be reconfigured by exerting a continuous upward force upon the platform 12 that causes the platform 12 to: a) elevate relative to the subjacent surface 18 over a range; and b) be blocked within that range at a plurality of different vertical locations against downward movement relative to the subjacent surface 18.

Figure 11:
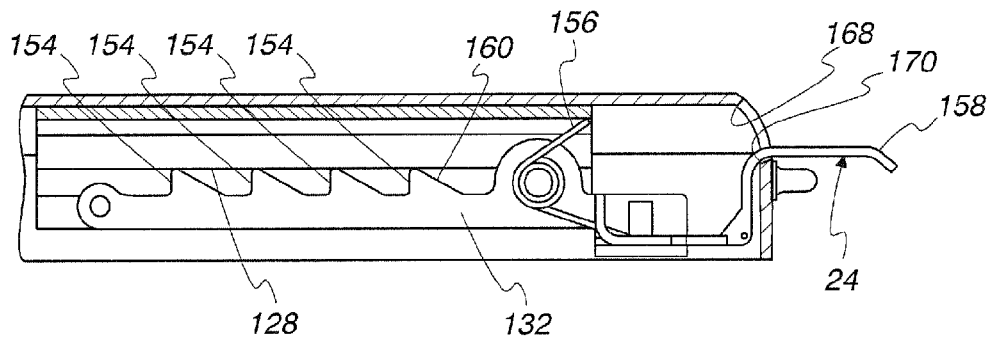
FIG. 11 is an enlarged, fragmentary, side elevation view of a part of the ratchet subassembly and actuator therefor, with these components in positions wherein a toothed bar on the ratchet subassembly is in an engaged position.
Figure 12:
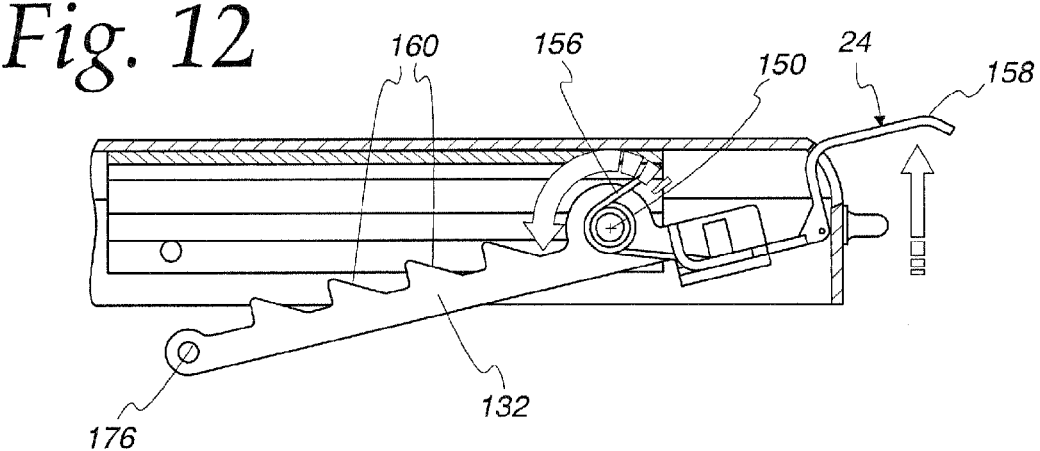
FIG. 12 is a view as in FIG. 11 wherein the actuator is repositioned to change the toothed bar into a disengaged position.

The control assembly 20 additionally includes an actuator 24 that is repositionable between a normal position, as shown in FIG. 11, and an actuated position, as shown in FIG. 12, thereby to change the control assembly 20 from its first state into a second state, wherein the platform 12 can be lowered over the aforementioned range.

The platform 12 is in the form of a flat panel 26 that is shown to be rectangular in shape, with a depending peripheral wall 28 therearound. The particular shape of the panel 26 is not critical to the invention.

The platform 12 may have a molded construction or may be made from flat metal stock that is bent to define the peripheral wall 28.

An obround opening 30 is formed through the panel 26 and is surrounded by an edge 32. The opening 30 is dimensioned to allow a user's fingers to be extended therethrough to allow grasping of the edge 32 to facilitate repositioning of the platform 12 through the application of upward and downward forces thereupon.

The base 16 is made up of paired first and second links 34, 36; 38, 40 at opposite sides 42, 44, respectively, of the platform 12.

The links 34, 36 are joined mid-length by a threaded post 46, secured by a nut 47, which guides pivoting movement of the links 34, 36 in a scissors-like action around the post axis 48. A threaded post 50 joins the links 38, 40 in like manner for pivoting movement around an axis 52.

The links 34, 36 have first ends 54, 56, respectively, attached to the platform 12. The opposite, second ends 58, 60, on the links 34, 36 respectively, connect to a first bracket 62 and a second bracket 64. Each of the brackets 62, 64 is designed to be secured to the subjacent support 18.

The first bracket 62 has an overall "U" shape with a base 66 with openings 68 therethrough to accommodate fasteners 70 that are directed through the base 66 to secure the first bracket 62 to the subjacent support 18 through any suitable structure thereon.

The second bracket 64 is likewise generally U-shaped opening upwardly, with a base 72 with openings 74 to accommodate fasteners 70 for securement of the second bracket 64 to the subjacent surface 18.

The link 36 is shown with a body 76 that is generally U-shaped in cross section. This facilitates formation by an extrusion process whereby the body 76 is rigidified adequately that it will not bend or buckle appreciably under the anticipated loading. The link 34 has a body 78 that is U-shaped in cross section over a portion of its length, likewise for purposes of rigidity.

In this embodiment, a spacer 80 is placed between the links 34, 36 to accommodate their U-shaped cross sections and facilitate smooth guided pivoting movement therebetween around the axis 48.

In this embodiment, the corresponding links 34, 36 and 38, 40 on opposite sides 42, 44 of the platform 12 have an identical construction. However, this is not a requirement.

Further, the base components on opposite sides 42, 44 of the platform 12 function in the same manner, with all components being either the same or mirror images of each other. Accordingly, hereinbelow it is necessary to define only exemplary components on one side of the platform 12, with it being understood that the components are constructed, and operate similarly, on the opposite side.

The end 58 of the link 34 is mounted to the first bracket 62 for pivoting movement around a fixed axis 82. The axis 82 is defined by a fastener 84 that extends through a bore 86 in an upstanding leg 88 on the first bracket 62 and an aligned bore 90 at the link end 58.

The link end 56 is mounted for pivoting movement relative to the platform 12 about a fixed axis 92 defined by a fastener 94. The fastener 94 extends through a bore 96 on the link end 56 and a selected one of two spaced bores 98 on one leg 100 of an angle bracket 102. The other angle bracket leg 104 is secured to the underside of the panel 26 through fasteners 106. The axes 82, 92 are substantial parallel to each other.

The link ends 54, 60 are respectively mounted to the platform 12 and second bracket 64 for guided, horizontal, translational movement so as to allow the links 34, 36 to pivot and the platform 12 to raise and lower depending upon the pivot direction.

More specifically, a guide track 108 is fixedly secured to an upstanding leg 110 on the second bracket 64. The guide bracket 108 has a guide groove 112 that is generally T-shaped in cross-section. The guide groove 112 receives a complementarily-shaped head 114 on a threaded post 116 and cooperates therewith so that the head 114 is stably guided within the groove 112 back and forth along a horizontal path indicated by the double-headed arrow 118. The post 116 also guides pivoting of the link end 60 about an axis 119, that is parallel to the axes 82, 92.

The link end 54 cooperates with a guide track 120 fixed to the underside of the panel 26, thereby to guide the link end 54 in a horizontal path, indicated by the double-headed arrow 122, that is substantially parallel to the path indicated by the double-headed arrow 118. The guide track 120 is held in place by fixing one wall 124 thereon to the peripheral side wall 28.

The link end 54 has a cantilevered post 126 thereon that moves guidingly within a slot 128 on a flat wall 129 residing in a plane spaced from and parallel to a plane within which the wall 124 resides. The slot 128 is elongate to guide translational movement of the post 126, and thus the link end 54, in a controlled path parallel to the double-headed arrow 122. The post 126 guides pivoting of the link end 54 about an axis 129, that is parallel to the axes 82, 92, 119.

The configuration of the slot 128 is the same as the slot 128' that accepts a cantilevered post 126' on the corresponding guide track 120' at the opposite platform side 44. The length L of the slot 128 dictates the amount of pivoting that is permitted between the links 34, 36 as the base is reconfigured to change the height of the support surface 14 between a fully raised position, as shown in FIG. 5, and a lowered operative position.

A web component 131 fixedly connects to the links 36, 40 and both rigidifies these links 36, 40 and unites them so that they move as a unit as the platform 12 is raised and lowered. The width W of the web component 130 is selected to optimize strength and rigidity without the addition of excessive weight.

The ratchet subassembly 22 consists of first and second toothed bars 132, 134, respectively, that are mirror images of each other and joined together and repositioned by the actuator 24.

The exemplary toothed bar 132 has an elongate body 136 and an offset mount 138 that is fixed to an elongate body 140 on the actuator 24. Through the body 140, the toothed bars 132, 134 are rigidly interconnected to move as a unit and function in the same manner. The body 132 has a bore 142 therethrough to accept a fastener/post 144. The fastener 144 extends through the spaced walls 124, 129 on the guide track 120 and the body 136 of the toothed bar 132 that resides therebetween. The toothed bar 132 is thus guided in pivoting movement around an axis 150 defined by the fastener 144.

The body 136 of the toothed bar 132 has a plurality of teeth 152 thereon, with each defining a blocking surface 154.

The toothed bar 132 is movable between: a) an engaged position, as shown in FIGS. 5 and 11, wherein the blocking surfaces 154 vertically span the slot 128 and reside in the path of the post 126; and b) a disengaged position, as shown in FIG. 12, wherein the post 126 can move without interference along the length L of the slot 128. Through a torsion coil spring 156, the toothed bar 132 is normally biasably urged towards its engaged position. The toothed bar 134 is likewise urged towards its engaged position by a torsion coil spring 156'.

The actuator 24 has a cantilevered handle 158 that can be grasped and repositioned by the user to change the actuator 24 between a normal position, as shown in FIG. 11, and an actuated position, as shown in FIG. 12.

As previously noted, the actuator 24 is repositionable between the normal and actuated positions to change the control assembly 20 from its first state into its second state. In the first state for the control assembly 20, the actuator 24 is in its normal position and the toothed bars 132, 134 are in their engaged positions. In this state, simple upward pressure application upon the platform 12, with the actuator 24 maintained in its normal position, causes the post 126 to bear on a ramp surface 160 on the tooth 152 to which it is adjacent.

In response to a vertical lifting force of a predetermined magnitude, the post 126 is urged against the adjacent ramp surface 160 with a force that has a component adequate to overcome the force of the spring 156 and pivot the toothed bar 132 towards its disengaged position. At the same time, this lifting force will cause the post 126 to shift horizontally in the direction of the arrow 162 towards the next adjacent tooth 152. As this occurs, the post 126 aligns over a receptacle 154 between adjacent teeth 152, whereupon the coil spring 156 drives the toothed bar 132 back towards its engaged position wherein the post 126 confronts an adjacent blocking surface 154. This produces a repeatable ratchet action that allows the platform 12 to be maintained at any of the potentially four different heights made possible by the toothed arrangement shown, once the lifting force is released. Of course, the number of teeth 152 and corresponding predetermined maintainable vertical platform locations is a matter of design choice. At any location that is set, the blocking surfaces 154 prevent lowering of the platform 12 until the control assembly 20 is changed into its second state and a downward pressure is applied to the platform 12.

In the second state for the control assembly 20, the actuator 24 is changed to the actuated position, as shown in FIG. 12, wherein the toothed bar 132 is changed to the disengaged position, whereby the post 126 can move freely within the length L of the slot 128 to allow the platform 12 to be lowered.

The actuator 24 causes the toothed bars 132, 134, that make up the ratchet subassembly 22, to pivot simultaneously about the same axis 150 and to function in the same manner at the opposite platform sites 42, 44.

The peripheral wall 28 on the platform 12 has a fully surrounded opening 166 through which the handle 158 projects. The opening 166 has top and bottom edges 168, 170 that respectively limit movement of the handle 158, and thus the actuator 24, as the actuator 24 is changed between its normal and actuated positions.

To avoid any possible inadvertent lowering of the platform 12 once a height therefor is selected, a secondary lock assembly at 172 may be utilized. In this embodiment, the lock assembly 172 consists of a pin 174 that is directed through the peripheral wall 28 and into a bore 176 on the toothed bar 132. The pin 174 can be a simple threaded element as shown, for example, in FIG. 5. A like pin 174 is provided on the opposite platform side 44.

The pin 174 is extended into the toothed bar 132, which represents the locked state for the lock assembly 172. The lock assembly 172 can be changed to an unlocked state therefor by retracting the pin 174, as shown in dotted lines in FIG. 5. The retraction can be to a fully separated state, as shown in FIG. 5, or to a state wherein the pin remains connected to the platform 12.

Figure 13:
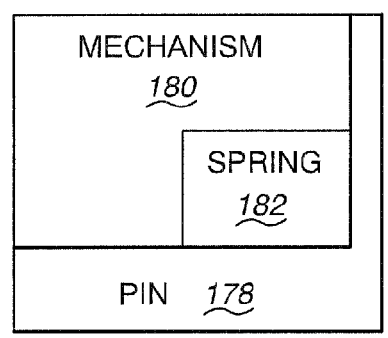
FIG. 13 is a schematic representation of a lock assembly for fixing the height of the platform.

In an alternative form, as shown schematically in FIG. 13, a pin 178, generically representing suitable pins, including the pin 174, has an associated conventional-type mechanism at 180 which allows the pin 178 to be normally biased by a spring 182 to an extended position. The pin 178 can be withdrawn against a force produced by the spring 182 and, through the mechanism 180, releasably maintained in a retracted position. Typically, the pin 170 will be withdrawn against the force of the spring 182 and turned to be locked in a stored position in which it can be maintained without any external force application. Opposite turning causes the pin 170 to be driven by the spring 182 into the extended position therefor.

With the above-described structure, the platform 12 can be raised by simply applying a vertical force thereupon, facilitated by the provision of the central opening 30 which permits grasping of the surrounding region at the edge 32. This central grasping location allows the application of a force at the center of the platform 12 that minimizes the tendency of the platform to skew as it is lifted, that might cause binding.

Release of the platform through the actuator 24 can be easily effected by one hand of an operator. Through the same hand, a downward force can be applied to the platform 12 to select a lowered platform height at which the actuator 24 can be released to allow the toothed bars 132, 134 to be re-engaged.

As an alternative to using the slots 128, 128' with fixed lengths that dictate fully raised and lowered platform positions, one or more stops 186, 188 may be provided to respectively cooperate between the links 34, 36, 38, 40 and: a) the guide tracks 120, 120'; and/or b) the guide tracks 108, 108' to limit reconfiguration of the base 16 and thereby establish predetermined fully raised and/or fully lowered positions for the platform 12, with the former shown in FIG. 4. Other suitable structure may be utilized to accomplish this range limitation and designing thereof could be readily accomplished by one of ordinary skill in this art.

By releasing the stops 186, 188, or other mechanism, the components of the base can be compactly stored against the underside of the platform 12 substantially within the vertical profile of the peripheral wall 28, as seen in FIG. 3.

As a further alternative design, the pins 126, 126' may be selectively releasable from the closed slots 128, 128' to allow the collapsed/storage state of FIG. 3 to be realized.

Figure 14:
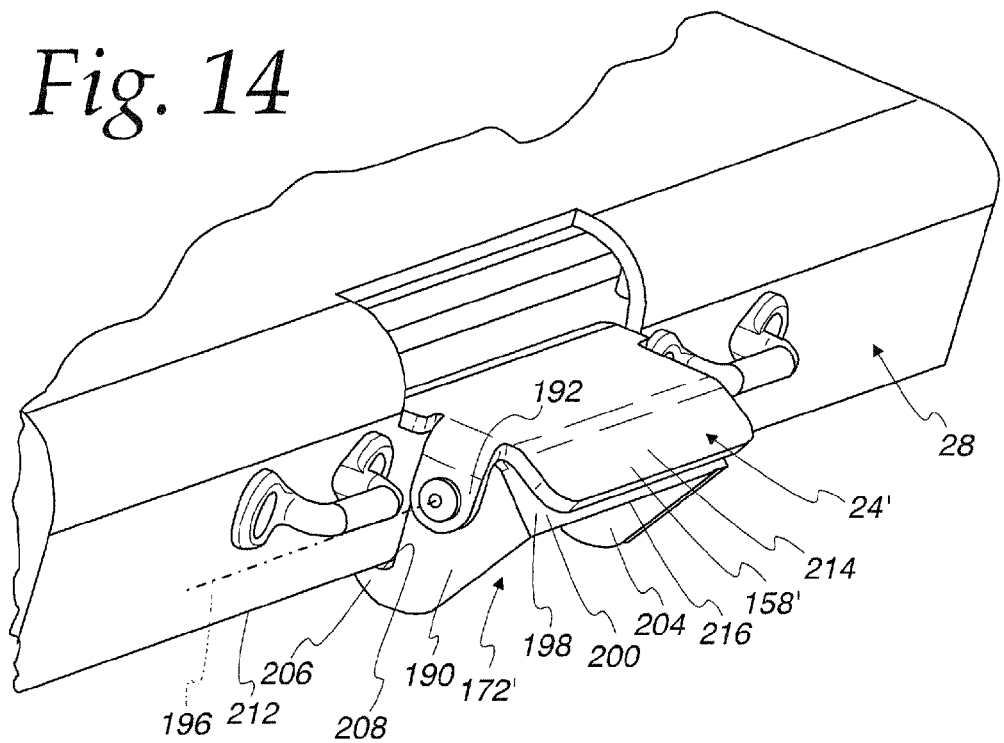
FIG. 14 is an enlarged, fragmentary, perspective view of the inventive variable height support with a modified form of actuator for the ratchet subassembly and a modified form of lock assembly, for fixing the height of the platform, associated with the actuator and in a locked state.
Figure 15:
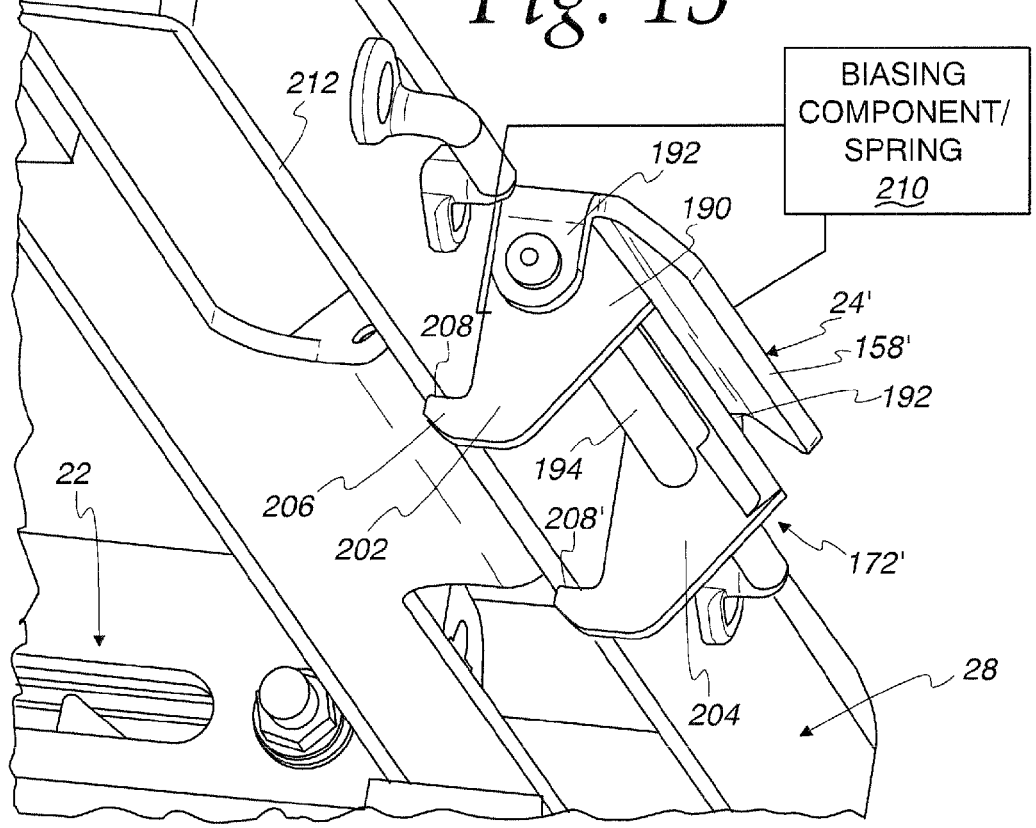
FIG. 15 is a view as in FIG. 14 from a different perspective.
Figure 16:
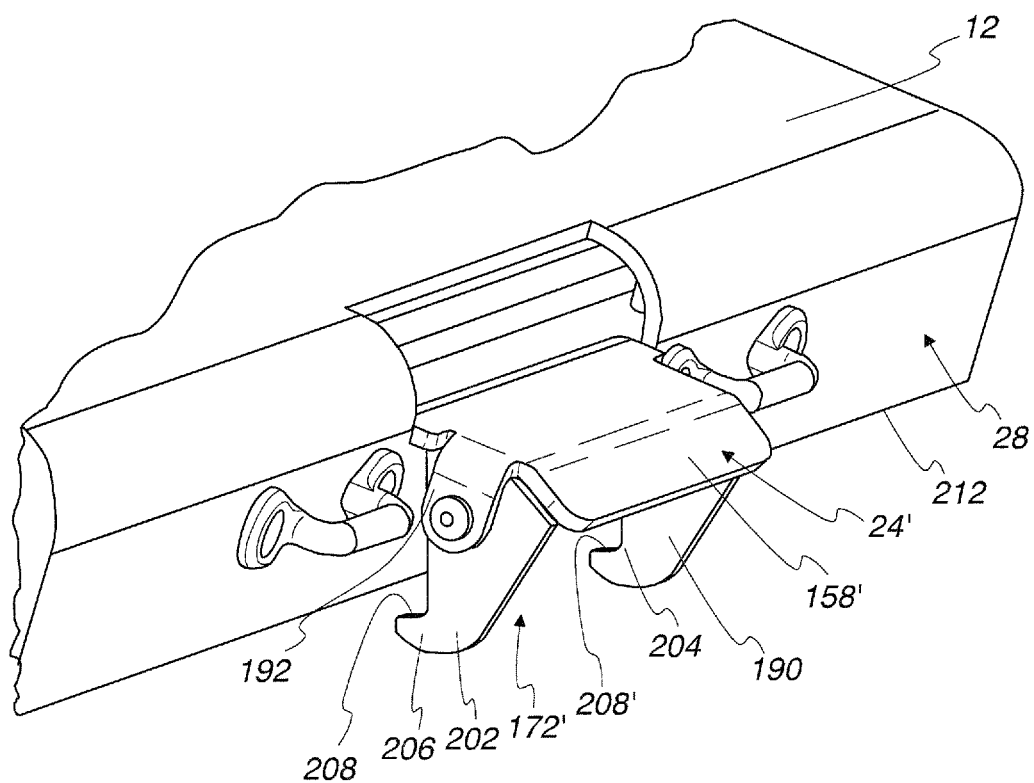
FIG. 16 is a view as in FIG. 14 with the lock assembly in an unlocked state.

Another variation of the invention is shown in FIGS. 14-16. In those Figures, a modified form of lock assembly 172' is shown in association with an actuator 24' on the platform 12.

The actuator 24' cooperates with the other operating components, including the ratchet subassembly 22, in the same manner that the actuator 24 does, as described above. The only difference between the actuator 24' and the actuator 24 is that the corresponding handle 158' is modified to cooperate with a lock component 190 that is part of the lock assembly 172'.

The handle 158' has a pair of depending ears 192 that support a pivot shaft 194. The lock component 190 is supported by the shaft 194 for pivoting movement about an axis 196 relative to the actuator handle 158' between a first position, as shown in FIGS. 14 and 15, and a second position, as shown in FIG. 16. The lock assembly 172' is in its locked state with the lock component 190 in its first position and in its unlocked state with the lock component 190 in its second position.

The lock component 190 has a U-shaped body 198 with a flat base wall 200 and spaced legs 202, 204 of like construction. Exemplary leg 202 has a generally flat shape that tapers progressively to an offset end 206 that defines a blocking surface 208. The leg 204 has a corresponding blocking surface 208'.

A biasing component/spring 210 acts between the actuator 24' and lock component 190 so as to normally urge the lock component 190 in pivoting movement around the axis 196 towards its first position, wherein the blocking surfaces 208, 208' abut to an edge 212 on the bottom of the depending peripheral platform wall 28. With the lock component 190 in its first position, the lock component 190 prevents the actuator 24' from being moved from its normal position, shown in FIGS. 14-16 and corresponding to the normal position for the actuator in FIG. 11, into its actuated position, which corresponds to the position shown for the actuator 24 in FIG. 12.

With the lock component 190 in its first position, the lock component 190 is situated to be engaged together with the graspable handle 158' by one hand of a user through which a squeezing action is performed to change the lock component 190 from its first position into its second position. More particularly, the handle 158' has a part/wall 214 that is adjacent a part of the lock component 190; in this embodiment the base wall 200. The parts/walls 200, 214 are adjacent to each other and can be grasped by one hand of a user most conveniently with the palm of the user's hand against the part/wall 214 and one or more fingers engaging the underside 216 of the part/base wall 200. By drawing the fingers towards the palm, the parts/walls 200, 214 are urged towards each other, whereupon the body 198 pivots around the axis 196 to change the lock component 190 from its first position into its second position.

In the second position for the lock component 190, the lock component 190 does not interfere with movement of the actuator 24' from its normal position into its actuated position.

The biasing component/spring 210 is made with a construction and strength adequate to consistently drive the lock component 190 into its first position when the actuator 24' is released. At the same time, the biasing force should be such that it can be overcome without excessive force application as the lock component 190 is repositioned to allow the actuator 24' to be moved from its normal position into its actuated position.

Suitable biasing components/springs 210 could be devised readily by one skilled in the art. As one example, a torsion coil spring might be utilized or, alternatively, a coil spring or another type of biasing component, acting between the lock component 190 and actuator component 24', might be utilized.

The foregoing disclosure of specific embodiments is intended to be illustrative of the broad concepts comprehended by the invention.

The invention claimed is:

1. A variable height support comprising:
    a platform defining an upwardly facing support surface;
    a base for supporting the platform in an operative position upon a subjacent surface and reconfigurable to selectively change a height of the support surface relative to the subjacent surface; and
    a control assembly that is operable to selectively: a) maintain the support surface at a selected height; and b) release the platform to allow the base to be reconfigured to change the height of the support surface relative to the subjacent surface,
    wherein the control assembly comprises a ratchet subassembly that, with the control assembly in a first state, interacts between the platform and base to allow the base to be reconfigured by exerting a continuous upward force upon the platform that causes the platform to elevate relative to the subjacent surface over a range and be blocked within the range at a plurality of different vertical locations against downward movement relative to the subjacent surface, wherein the ratchet subassembly comprises a first toothed bar that is mounted for pivoting movement relative to the platform about an axis, wherein the control assembly further comprises an actuator that is repositionable between a normal position and an actuated position thereby to change the control assembly from the first state into a second state wherein the platform can be lowered over the range,
    wherein the first toothed bar is biasably urged towards an engaged position and is movable from the engaged position into a disengaged position as an incident of the actuator being changed from the normal position into the actuated position,
    further comprising a lock assembly that is changeable between a locked state and an unlocked state, the lock assembly in the locked state fixing the first toothed bar in the engaged position, the lock assembly in the unlocked state allowing the first toothed bar to be moved from the engaged position to the disengaged position by the actuator, wherein the lock assembly comprises a in that is directed into the first toothed bar and platform with the lock assembly in the locked state.

2. The variable height support according to claim 1 wherein the base comprises first and second links each with first and second ends, the links are joined to each other for relative pivoting movement, the first ends of the first and second links are connected to the platform and the second ends of the first and second links bear against the subjacent surface with the platform in the operative position.

3. The variable height support according to claim 2 wherein the base further comprises first and second brackets to be fixedly connected to the subjacent surface, the first bracket connected to the second end of the first link for pivoting movement about a fixed axis, the second bracket connected to the second end of the second link so that the second end of the second link is guided by the second bracket in a horizontally extending path.

4. The variable height support according to claim 3 wherein the horizontally extending path is substantially straight.

5. The variable height support according to claim 2 wherein the links each comprises an extruded form with a U-shaped cross-sectional configuration.

6. The variable height support according to claim 2 wherein the ratchet subassembly comprises a first toothed bar that is mounted for pivoting movement relative to the platform about an axis, the variable height support further comprising a track with an elongate slot, the first end of one of the links is connected to the track for guided movement in a horizontal path and the axis about which the first toothed bar pivots extends through the track.

7. The variable height support according to claim 1 wherein the pin is translatable relative to the platform between an extended position and a retracted position, the pin is biased towards the extended position in which the pin resides with the lock assembly in the locked state, the pin movable along a line from the extended position into the retracted position and turnable around the line to a retracted and stored position wherein the pin is maintained upon the platform in the retracted position without requiring any external force application upon the pin.

8. The variable height support according to claim 1 wherein the actuator is operatively engaged with a lock component, the lock component comprises a blocking surface that engages the platform with the lock component in its first position to block movement of the actuator from its normal position into its actuated position.

9. The variable height support according to claim 1 wherein the ratchet assembly comprises a second toothed bar that is spaced from the first toothed bar and mounted for pivoting movement relative to the platform.

10. The variable height support according to claim 9 wherein the second toothed bar is biasably urged towards an engaged position and is movable from its engaged position into a disengaged position as an incident of the actuator being changed from the normal position into the actuated position.

11. The variable height support according to claim 10 wherein the actuator is fixed to each of the first and second toothed bars so that the first and second toothed bars follow movement of the actuator as the actuator is moved between the normal and actuated positions.

12. The variable height support according to claim 11 wherein the actuator pivots about an axis as the actuator changes between the normal and actuated positions.

13. The variable height support according to claim 12 wherein the platform has a depending peripheral wall and the actuator projects through the depending peripheral wall.

14. The variable height support according to claim 12 wherein the control assembly comprises a coil torsion spring that biasably urges the first toothed bar towards its engaged position.

15. The variable height support according to claim 10 wherein the actuator is fixed to each of the first and second toothed bars so that the first and second toothed bars follow movement of the actuator as the actuator is moved between the normal and actuated positions.

16. The variable height support according to claim 15 wherein the actuator pivots about an axis as the actuator changes between the normal and actuated positions.

17. The variable height support according to claim 16 wherein the platform has a depending peripheral wall and the actuator projects through the depending peripheral wall.

18. The variable height support according to claim 17 wherein the control assembly comprises a coil torsion spring that biasably urges the first toothed bar towards its engaged position.

19. The variable height support according to claim 1 wherein the platform has an opening through the upper surface bounded by an edge, the opening configured to allow a user's hand to be directed into the opening to allow the edge to be grasped to thereby facilitate vertical movement of the platform.

20. The variable height support according to claim 1 wherein the platform comprises a molded part that defines the upwardly facing support surface.

21. The variable height support according to claim 1 wherein the platform comprises a part that defines the upwardly facing surface and a depending peripheral wall and the axis about which the first toothed bar is mounted for pivoting movement extends through the peripheral wall.

22. A variable height support comprising:
a platform defining an upwardly facing support surface;
a base for supporting the platform in an operative position upon a subjacent surface and reconfigurable to selectively change a height of the support surface relative to the subjacent surface; and
a control assembly that is operable to selectively: a) maintain the support surface at a selected height; and b) release the platform to allow the base to be reconfigured to change the height of the support surface relative to the subjacent surface,
wherein the control assembly comprises a ratchet subassembly that, with the control assembly in a first state, interacts between the platform and base to allow the base to be reconfigured by exerting a continuous upward force upon the platform that causes the platform to elevate relative to the subjacent surface over a range and be blocked within the range at a plurality of different vertical locations against downward movement relative to the subjacent surface, wherein the ratchet subassembly comprises a first toothed bar that is mounted for pivoting movement relative to the platform,
wherein the control assembly further comprises an actuator that is repositionable between a normal position and an actuated position thereby to change the control assembly from the first state into a second state wherein the platform can be lowered over the range,
further comprising a lock assembly that is changeable between a locked state and an unlocked state, the lock assembly in the locked state fixing the first toothed bar in the engaged position, the lock assembly in the unlocked state allowing the first toothed bar to be moved from the engaged position to the disengaged position by the actuator, wherein the lock assembly comprises a pin that is directed into the first toothed bar and platform with the lock assembly in the locked state.

23. The variable height support of claim 22, wherein the ratchet assembly comprises a first toothed bar that is mounted for pivoting movement relative to the platform about an axis.

24. The variable height support according to claim 22 wherein the base comprises first and second links each with first and second ends, the links are joined to each other for relative pivoting movement, the first ends of the first and second links are connected to the platform and the second ends of the first and second links bear against the subjacent surface with the platform in the operative position.

25. The variable height support according to claim 22 wherein the pin is translatable relative to the platform between an extended position and a retracted position, the pin is biased towards the extended position in which the pin resides with the lock assembly in the locked state, the pin movable along a line from the extended position into the retracted position and turnable around the line to a retracted and stored position wherein the pin is maintained upon the platform in the retracted position without requiring any external force application upon the pin.

26. The variable height support according to claim 22 wherein the ratchet subassembly comprises a second toothed bar that is spaced from the first toothed bar and mounted for pivoting movement relative to the platform.

27. The variable height support according to claim 26 wherein the second toothed bar is biasably urged towards an engaged position and is movable from its engaged position into a disengaged position as an incident of the actuator being changed from the normal position into the actuated position.

* * * * *

UNITED STATES PATENT AND TRADEMARK OFFICE
CERTIFICATE OF CORRECTION

PATENT NO. : 8,544,391 B2  
APPLICATION NO. : 13/316743  
DATED : October 1, 2013  
INVENTOR(S) : Howard T. Knox et al.

Page 1 of 1

It is certified that error appears in the above-identified patent and that said Letters Patent is hereby corrected as shown below:

In the Claims

In column 10, claim 1, line 37, after "lock assembly comprises a" replace "in" with --pin--.

Signed and Sealed this  
Third Day of December, 2013

Margaret A. Focarino  
*Commissioner for Patents of the United States Patent and Trademark Office*